(12) United States Patent
Luo et al.

(10) Patent No.: US 11,470,071 B2
(45) Date of Patent: Oct. 11, 2022

(54) AUTHENTICATION FOR LOGICAL OVERLAY NETWORK TRAFFIC

(71) Applicant: VMware, Inc., Palo Alto, CA (US)

(72) Inventors: Ye Luo, Beijing (CN); Jinjun Gao, Beijing (CN); Qi Wu, Beijing (CN); Donghai Han, Beijing (CN)

(73) Assignee: VMWARE, INC., Palo Alto, CA (US)

(*) Notice: Subject to any disclaimer, the term of this patent is extended or adjusted under 35 U.S.C. 154(b) by 208 days.

(21) Appl. No.: 16/852,553

(22) Filed: Apr. 20, 2020

(65) Prior Publication Data

US 2021/0328977 A1 Oct. 21, 2021

(51) Int. Cl.
*H04L 9/40* (2022.01)
*G06F 9/455* (2018.01)

(52) U.S. Cl.
CPC .......... *H04L 63/08* (2013.01); *G06F 9/45558* (2013.01); *G06F 2009/45587* (2013.01)

(58) Field of Classification Search
CPC . H04L 63/08; H04L 63/0272; H04L 63/0428; H04L 63/126; G06F 9/45558; G06F 2009/45587
See application file for complete search history.

(56) References Cited

U.S. PATENT DOCUMENTS

| | | | |
|---|---|---|---|
| 7,421,503 B1* | 9/2008 | Stieglitz | H04L 63/08 726/4 |
| 7,529,933 B2* | 5/2009 | Palekar | H04L 63/0428 713/153 |
| 9,106,257 B1* | 8/2015 | Pohlack | H04L 1/0061 |
| 9,641,434 B1* | 5/2017 | Laurence | H04L 45/7453 |
| 10,764,249 B1* | 9/2020 | Kommula | H04L 63/0272 |
| 10,805,210 B1* | 10/2020 | Kondapavuluru | H04L 45/34 |
| 11,184,277 B1* | 11/2021 | Talur | H04L 45/04 |
| 2002/0091921 A1* | 7/2002 | Kunzinger | H04L 63/0471 713/153 |
| 2002/0154635 A1* | 10/2002 | Liu | H04L 63/0428 370/392 |
| 2003/0110294 A1* | 6/2003 | Luo | H04W 12/125 709/230 |
| 2004/0003280 A1* | 1/2004 | Narayanan | H04W 36/0038 726/12 |
| 2004/0128553 A1* | 7/2004 | Buer | H04L 67/1001 713/153 |
| 2007/0214502 A1* | 9/2007 | McAlister | H04L 63/0428 726/15 |

(Continued)

*Primary Examiner* — Aravind K Moorthy
(74) *Attorney, Agent, or Firm* — Su IP Consulting (57) ABSTRACT

Example methods and systems for authentication for logical overlay network traffic are described. In one example, a first computer system may detect an inner packet and generate authentication information associated with the inner packet based on control information from a management entity. The authentication information may indicate that the inner packet originates from a trusted zone. The first computer system may further generate an encapsulated packet by encapsulating the inner packet with an outer header that specifies the authentication information, and send the encapsulated packet towards the second virtualized computing instance to cause a second computer system to verify that the inner packet originates from the trusted zone based on the authentication information.

21 Claims, 6 Drawing Sheets

(56) References Cited

U.S. PATENT DOCUMENTS

| | | | | |
|---|---|---|---|---|
| 2008/0310411 A1* | 12/2008 | Yamauchi | H04L 69/04 | 370/389 |
| 2011/0321145 A1* | 12/2011 | Shimotono | H04L 9/3228 | 726/7 |
| 2012/0216037 A1* | 8/2012 | Simcoe | H04L 9/3236 | 713/168 |
| 2012/0243541 A1* | 9/2012 | Zhao | H04L 47/00 | 370/392 |
| 2013/0336486 A1* | 12/2013 | Agiwal | H04W 12/0433 | 380/270 |
| 2014/0056151 A1* | 2/2014 | Petrus | H04L 69/22 | 370/242 |
| 2014/0233565 A1* | 8/2014 | Mahapatra | H04L 45/74 | 370/392 |
| 2014/0330982 A1* | 11/2014 | Jalan | H04L 63/1466 | 709/229 |
| 2015/0063353 A1* | 3/2015 | Kapadia | H04L 45/745 | 370/392 |
| 2015/0081863 A1* | 3/2015 | Garg | H04L 41/00 | 709/223 |
| 2015/0237027 A1* | 8/2015 | Kim | H04L 63/205 | 726/3 |
| 2016/0014126 A1* | 1/2016 | Jalan | H04L 63/166 | 726/7 |
| 2016/0021058 A1* | 1/2016 | Chen | H04L 63/1466 | 726/13 |
| 2016/0028604 A1* | 1/2016 | Chakrabarti | H04L 43/0852 | 370/252 |
| 2016/0078581 A1* | 3/2016 | Maher | G06F 16/2228 | 705/325 |
| 2016/0105401 A1* | 4/2016 | Vemulapalli | H04L 63/0272 | 713/160 |
| 2016/0191678 A1* | 6/2016 | Brandeburg | H04L 69/166 | 370/392 |
| 2017/0012947 A1* | 1/2017 | Lee | H04W 76/10 | |
| 2017/0013454 A1* | 1/2017 | Lee | H04L 63/06 | |
| 2017/0019428 A1* | 1/2017 | Cohn | H04L 65/1036 | |
| 2017/0149582 A1* | 5/2017 | Cohn | H04L 12/66 | |
| 2017/0171055 A1* | 6/2017 | Wang | H04L 41/0853 | |
| 2017/0324849 A1* | 11/2017 | Pfister | H04L 61/2592 | |
| 2017/0346731 A1* | 11/2017 | Pukhraj Jain | H04L 12/4633 | |
| 2018/0063193 A1* | 3/2018 | Chandrashekhar | H04L 12/4641 | |
| 2018/0069787 A1* | 3/2018 | Hill | H04L 12/66 | |
| 2018/0123951 A1* | 5/2018 | Wang | H04L 45/74 | |
| 2018/0159790 A1* | 6/2018 | Wang | H04L 47/6215 | |
| 2018/0287902 A1* | 10/2018 | Chitalia | H04L 43/045 | |
| 2018/0288090 A1* | 10/2018 | Olarig | H04L 63/1458 | |
| 2019/0068496 A1* | 2/2019 | Tessmer | H04L 12/413 | |
| 2019/0075019 A1* | 3/2019 | Wang | H04L 41/0806 | |
| 2019/0132296 A1* | 5/2019 | Jiang | H04L 69/22 | |
| 2019/0238365 A1* | 8/2019 | Sudhakaran | G06F 9/45558 | |
| 2019/0246160 A1* | 8/2019 | Williams | H04L 9/0838 | |
| 2019/0312820 A1* | 10/2019 | Yu | H04L 47/36 | |
| 2019/0349268 A1* | 11/2019 | Pai | H04L 63/0892 | |
| 2019/0372948 A1* | 12/2019 | Varghese | H04L 63/0485 | |
| 2020/0036552 A1* | 1/2020 | Boutros | H04L 12/4641 | |
| 2020/0059458 A1* | 2/2020 | Abraham | H04L 45/586 | |
| 2020/0059459 A1* | 2/2020 | Abraham | H04L 12/4641 | |
| 2020/0076685 A1* | 3/2020 | Vaidya | H04L 12/4641 | |
| 2020/0099599 A1* | 3/2020 | Yuan | H04L 43/12 | |
| 2020/0104161 A1* | 4/2020 | Kapur | G06F 11/2025 | |
| 2020/0236046 A1* | 7/2020 | Jain | G06F 9/45558 | |
| 2020/0274902 A1* | 8/2020 | Gopal | H04L 63/0209 | |
| 2020/0287826 A1* | 9/2020 | Wang | H04L 12/4679 | |
| 2020/0304477 A1* | 9/2020 | Venkataraman | H04L 63/0464 | |
| 2020/0322325 A1* | 10/2020 | Filsfils | H04L 63/126 | |
| 2020/0344662 A1* | 10/2020 | Maino | H04W 28/0268 | |
| 2020/0366610 A1* | 11/2020 | Wang | H04L 47/35 | |
| 2020/0412576 A1* | 12/2020 | Kondapavuluru | H04L 63/0435 | |
| 2020/0412643 A1* | 12/2020 | Kurian | H04L 45/38 | |
| 2021/0021486 A1* | 1/2021 | Jain | H04L 12/4625 | |
| 2021/0021509 A1* | 1/2021 | Sajassi | H04L 45/745 | |
| 2021/0051112 A1* | 2/2021 | Wondra | H04L 12/4641 | |
| 2021/0075722 A1* | 3/2021 | Rahman | H04L 43/10 | |
| 2021/0160251 A1* | 5/2021 | Keisam | H04L 63/14 | |
| 2021/0185025 A1* | 6/2021 | Wang | G06F 9/505 | |
| 2021/0185534 A1* | 6/2021 | Vankieken | H04W 12/122 | |
| 2021/0258347 A1* | 8/2021 | Batta | H04L 45/74 | |
| 2021/0306338 A1* | 9/2021 | Miriyala | G06F 21/6209 | |
| 2021/0344650 A1* | 11/2021 | Kondapavuluru | H04L 9/0819 | |
| 2021/0352000 A1* | 11/2021 | Devaraj | H04L 45/66 | |
| 2021/0385203 A1* | 12/2021 | Wang | H04L 9/0643 | |
| 2021/0392016 A1* | 12/2021 | Boutros | H04L 12/4633 | |
| 2021/0409336 A1* | 12/2021 | Talur | H04L 45/38 | |

* cited by examiner

AUTHENTICATION FOR LOGICAL OVERLAY NETWORK TRAFFIC

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. In practice, VMs supported by different hosts may be deployed on the same logical overlay network. However, traffic over logical overlay networks may be susceptible to undesirable malicious activities.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first," "second" and so on are used to describe various elements, these elements should not be limited by these terms. These terms are used to distinguish one element from another. A first element may be referred to as a second element, and vice versa.

Challenges relating to network security will now be explained in more detail using FIG. 1, which is a schematic diagram illustrating example software-defined networking (SDN) environment 100 in which authentication for logical overlay network traffic may be performed. Depending on the desired implementation, SDN environment 100 may include additional and/or alternative components than that shown in FIG. 1. SDN environment 100 includes multiple hosts, such as host-A 110A, host-B 110B and host-C 110C that are inter-connected via physical network 104. In practice, SDN environment 100 may include any number of hosts (also known as a "host computers", "host devices", "physical servers", "server systems", "transport nodes," etc.), where each host may be supporting tens or hundreds of VMs.

Each host 110A/110B/110C may include suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM2 132; host-B 110B supports VM3 133 and VM4 134; and host-C 110C supports VM5 135 VM6 136. Hypervisor 114A/114B/114C maintains a mapping between underlying hardware 112A/112B/112C and virtual resources allocated to respective VMs 131-136. Hardware 112A/112B/112C includes suitable physical components, such as central processing unit(s) (CPU(s)) 120A/120B/120C; memory 122A/122B/122C; physical network interface controllers (NICs) 124A/124B/124C; and storage disk(s) 126A/126B/126C, etc.

Virtual resources are allocated to respective VMs 131-136 to support a guest operating system (OS) and application(s). For example, the virtual resources may include virtual CPU, guest physical memory, virtual disk, virtual network interface controller (VNIC), etc. Hardware resources may be emulated using virtual machine monitors (VMMs). For example in FIG. 1, VNICs 141-146 are emulated by corresponding VMMs (not shown for simplicity). The VMMs may be considered as part of respective VMs 131-136, or alternatively, separated from VMs 131-136. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114C implements virtual switch 115A/115B/115C and logical distributed router (DR) instance 117A/117B/117C to handle egress packets from, and ingress packets to, corresponding VMs 131-136. In SDN environment 100, logical switches and logical DRs may be implemented in a distributed manner and can span multiple hosts to connect VMs 131-136. For example, logical switches that provide logical layer-2 connectivity may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical switch port. For example, logical switch ports 151-156 (labelled "LSP1" to "LSP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding VM (e.g., when the source host and destination host do not have a distributed virtual switch spanning them).

SDN manager 170 and SDN controller 160 are example network management entities in SDN environment 100. To send and receive the control information (e.g., configuration information), each host 110A/110B/110C may implement local control plane (LCP) agent (not shown) to interact with SDN controller 160. For example, control-plane channel 101/102/103 may be established between SDN controller 160 and host 110A/110B/110C using TCP over Secure Sockets Layer (SSL), etc. Management entity 160/170 may be implemented using physical machine(s), virtual machine(s), a combination thereof, etc. Hosts 110A-C may also maintain data-plane connectivity with each other via physical network 104.

Through virtualization of networking services in SDN environment 100, logical overlay networks may be provisioned, changed, stored, deleted and restored programmatically without having to reconfigure the underlying physical hardware architecture. A logical overlay network (also known as "logical network") may be formed using any suitable tunneling protocol, such as Generic Network Virtualization Encapsulation (GENEVE), Virtual eXtensible Local Area Network (VXLAN), Stateless Transport Tunneling (STT), etc. For example, tunnel encapsulation may be implemented according to a tunneling protocol to extend layer-2 segments across multiple hosts. The term "tunnel" in relation to a logical overlay network may refer generally to a tunnel established between a pair of VTEPs over physical network 104, over which respective hosts are in layer-3 connectivity with one another.

Figure 1:
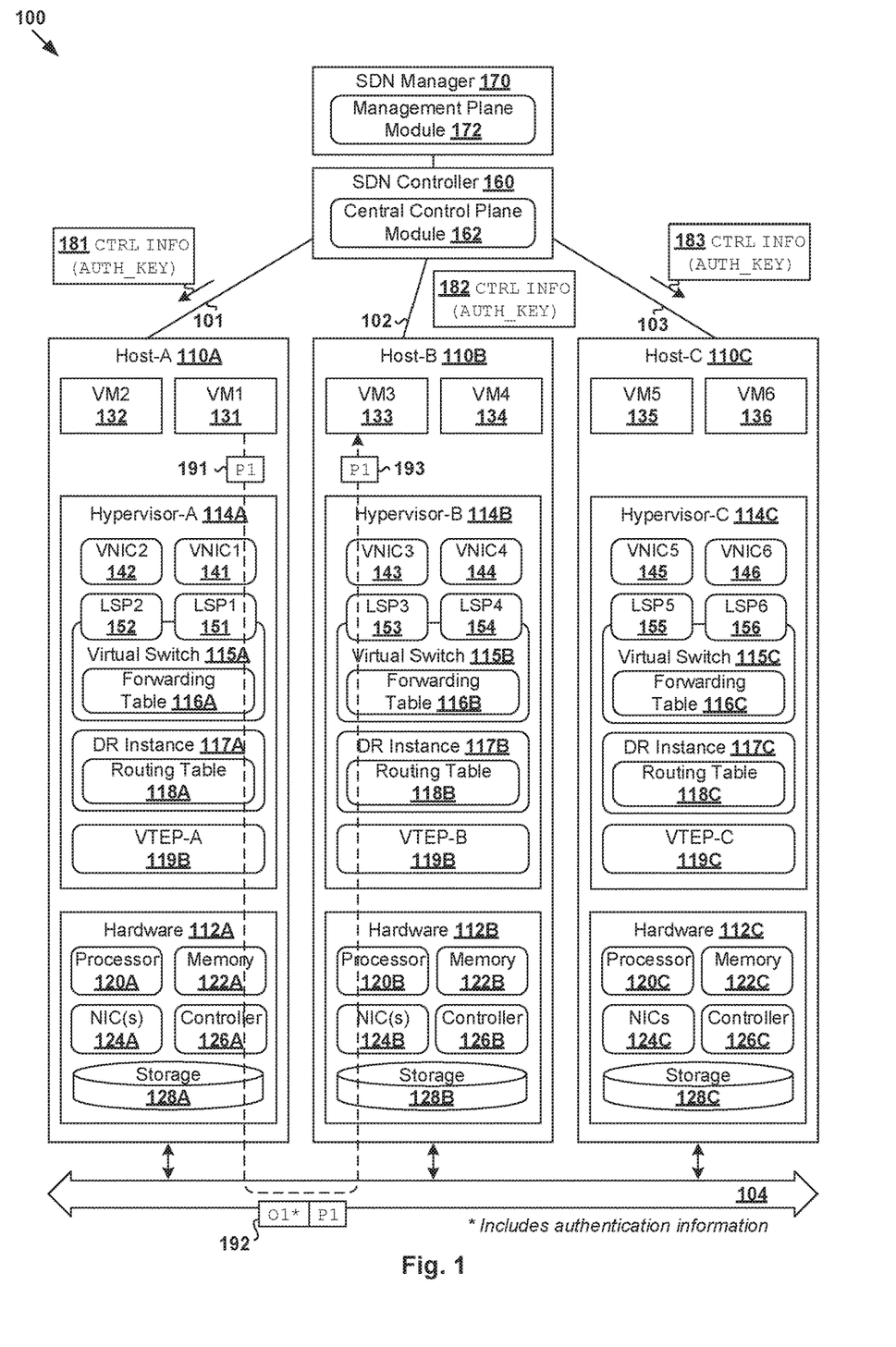
FIG. 1 is a schematic diagram illustrating an example software-defined networking (SDN) environment in which authentication for logical overlay network traffic may be performed.
Figure 2:
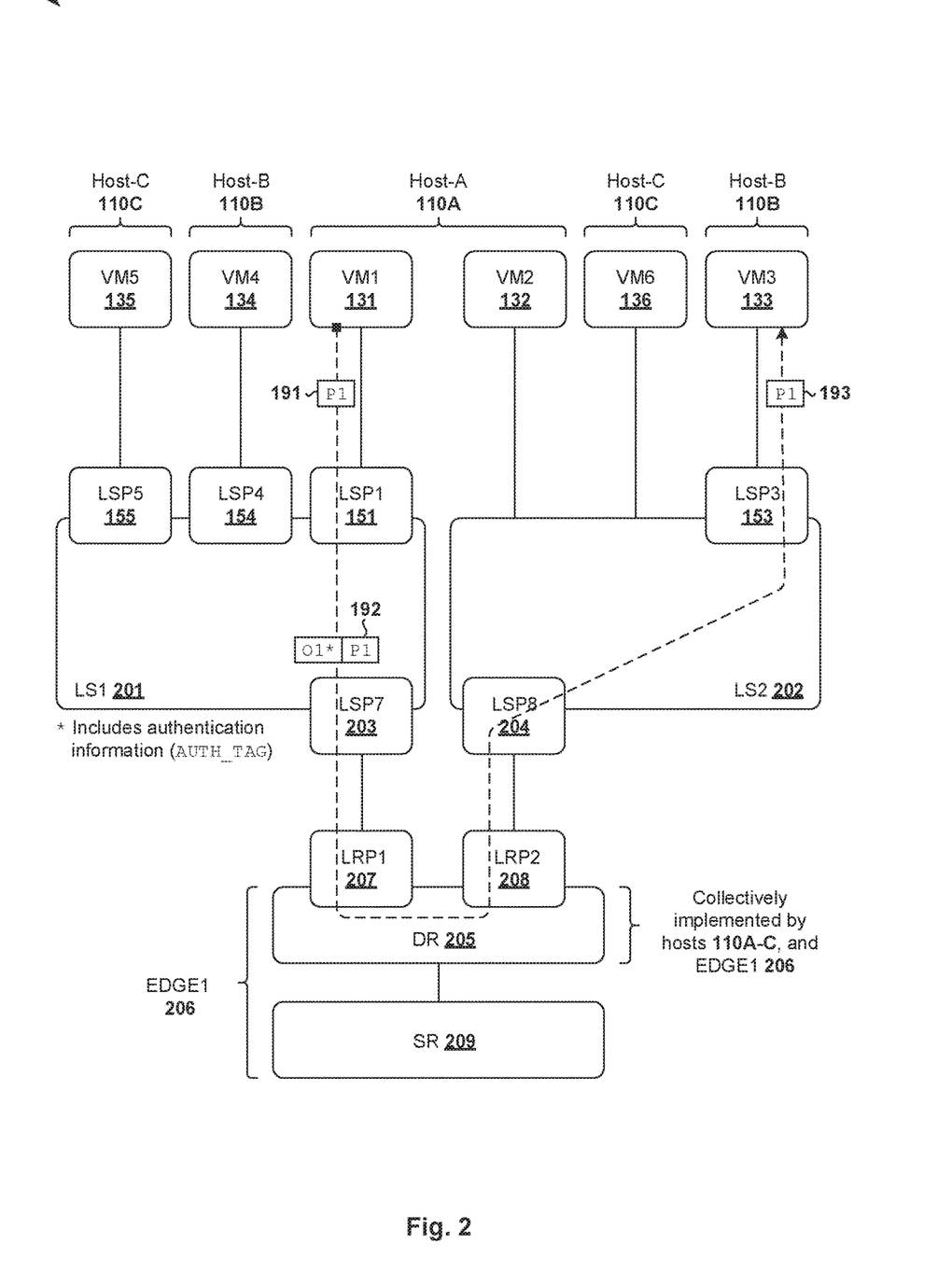
FIG. 2 is a schematic diagram illustrating an example management-plane view of logical overlay networks in the SDN environment in FIG. 1.

Some example logical overlay networks are shown in FIG. 2, which is a schematic diagram illustrating example management plane view 200 of SDN environment 100 in FIG. 1. Here, VM1 131, VM4 134 and VM5 135 are located on a first logical layer-2 segment associated with virtual network identifier (VNI)=5000 and connected to a first logical switch (see "LS1" 201). VM2 132, VM3 133 and VM6 136 are located on a second logical layer-2 segment associated with VNI=6000 and connected to a second logical switch (see "LS2" 202). With the growth of infrastructure-as-a-service (IaaS), logical overlay networks may be deployed to support multiple tenants. In this case, each logical overlay network may be designed to be an abstract representation of a tenant's network in SDN environment 100.

A logical DR (see "DR" 205) connects logical switches 201-202 to facilitate communication among VMs 131-136 on different segments. See also logical switch ports "LSP7" 203 and "LSP8" 204, and logical router ports "LRP1" 207 and "LRP2" 208 connecting DR 205 with logical switches 201-202. Logical switch 201/202 may be implemented collectively by multiple transport nodes, such as using virtual switches 115A-C and represented internally using forwarding tables 116A-C. DR 205 may be implemented collectively by multiple transport nodes, such as using edge node 206 and hosts 110A-C. For example, DR 205 may be implemented using DR instances 117A-C and represented internally using routing tables 118A-C at respective hosts 110A-C.

Edge node 206 (labelled "EDGE1") may implement one or more logical DRs and logical service routers (SRs), such as DR 205 and SR 209 in FIG. 2. SR 209 may represent a centralized routing component that provides centralized stateful services to VMs 131-136, such as IP address assignment using dynamic host configuration protocol (DHCP), load balancing, network address translation (NAT), etc. EDGE1 206 may be implemented using VM(s) and/or physical machines ("bare metal machines"), and capable of performing functionalities of a switch, router (e.g., logical service router), bridge, gateway, edge appliance, or any combination thereof. As will be discussed using FIG. 6, EDGE1 206 may be deployed at the edge of a geographical site to facilitate north-south traffic to an external network, such as another data center at a different geographical site.

Depending on the desired implementation, a multi-tier topology may be used to isolate multiple tenants. For example, a two-tier topology includes an upper tier associated with a provider logical router (PLR) and a lower tier associated with a tenant logical router (TLR). Each tier may include both DRs and SRs, or DRs and SRs on the upper tier (known as "tier-0") but only DRs at the lower tier (known "tier-1"). In this case, a logical router may be categorized as one of the following types: TLR-DR, TLR-SR, PLR-DR and PLR-SR. Depending on the desired implementation, DR 205 and SR 209 may be connected via a transit logical switch (not shown in FIG. 2 for simplicity).

Referring to FIG. 1 again, hypervisor 114A/114B/114C may implement a virtual tunnel endpoint (VTEP) to encapsulate and decapsulate packets with an outer header (also known as a tunnel header) identifying a logical overlay network (e.g., VNI=5000) to facilitate communication over the logical overlay network. For example, hypervisor-A 114A implements first VTEP-A 119A associated with (IP address=IP-A, MAC address=MAC-A, VTEP label=VTEP-A), hypervisor-B 114B implements second VTEP-B 119B with (IP-B, MAC-B, VTEP-B) and hypervisor-C 114C implements third VTEP-C 119C with (IP-C, MAC-C, VTEP-C). Encapsulated packets may be sent via a logical overlay tunnel established between a pair of VTEPs over physical network 104. In practice, a particular host may support more than one VTEP.

Conventionally, there are security risks associated with transmission of logical overlay network traffic via VTEPs 119A-C implemented by respective hosts 110A-C. For example on host-A 110A, VTEP-A 119A may be configured to be an open interface (e.g., independent interface) that is accessible by various processes running on host-A 110A. These processes may share a network namespace and interact with VTEP-A 119A to send encapsulated packets to destination host 110B. In this case, a rogue process may take advantage of the open interface to perform various malicious activities, such as generating and sending encapsulated packets that are capable of bypassing distributed firewall rule(s) in SDN environment 100. If such malicious activities are successful, the performance of hosts 110A-C and VMs 131-136 will be affected.

Authentication for Logical Overlay Network Traffic

According to examples of the present disclosure, authentication may be performed for logical overlay network traffic to mitigate security risks in SDN environment 100. Instead of assuming that all logical overlay network traffic is non-malicious, authentication information may be included in encapsulated packets transmitted between VTEPs to indicate whether they originate from a trusted zone. The authentication information may be used to indicate that a transport node (e.g., host-A 110A) is "allowed" or "authorized" by management entity 160/170 to encapsulate inner packets originating from a set of virtual interfaces (VIFs) on the transport node.

As used herein, the term "trusted zone" may refer generally to a group of virtualized computing instance(s), interface(s), process(es) and/or application(s) that are assigned with a substantially high level of trust by a management entity. The term "logical overlay network traffic" may refer generally to encapsulated packet(s) transmitted between a source and a destination that are supported by different hosts, and deployed on the same logical overlay network (e.g., VNI=5000) or different logical overlay networks (e.g., source VNI=6000 to destination VNI=5000). Throughout the present disclosure, various examples will be explained using host-A 110A as an example "first host" or "first computer system," host-B 110B as "second host" or "second computer system," source VM1 131 as "first virtualized computing instance," destination VM3 133 as "second virtualized computing instance," SDN controller 160 as "management entity," etc.

Figure 3:
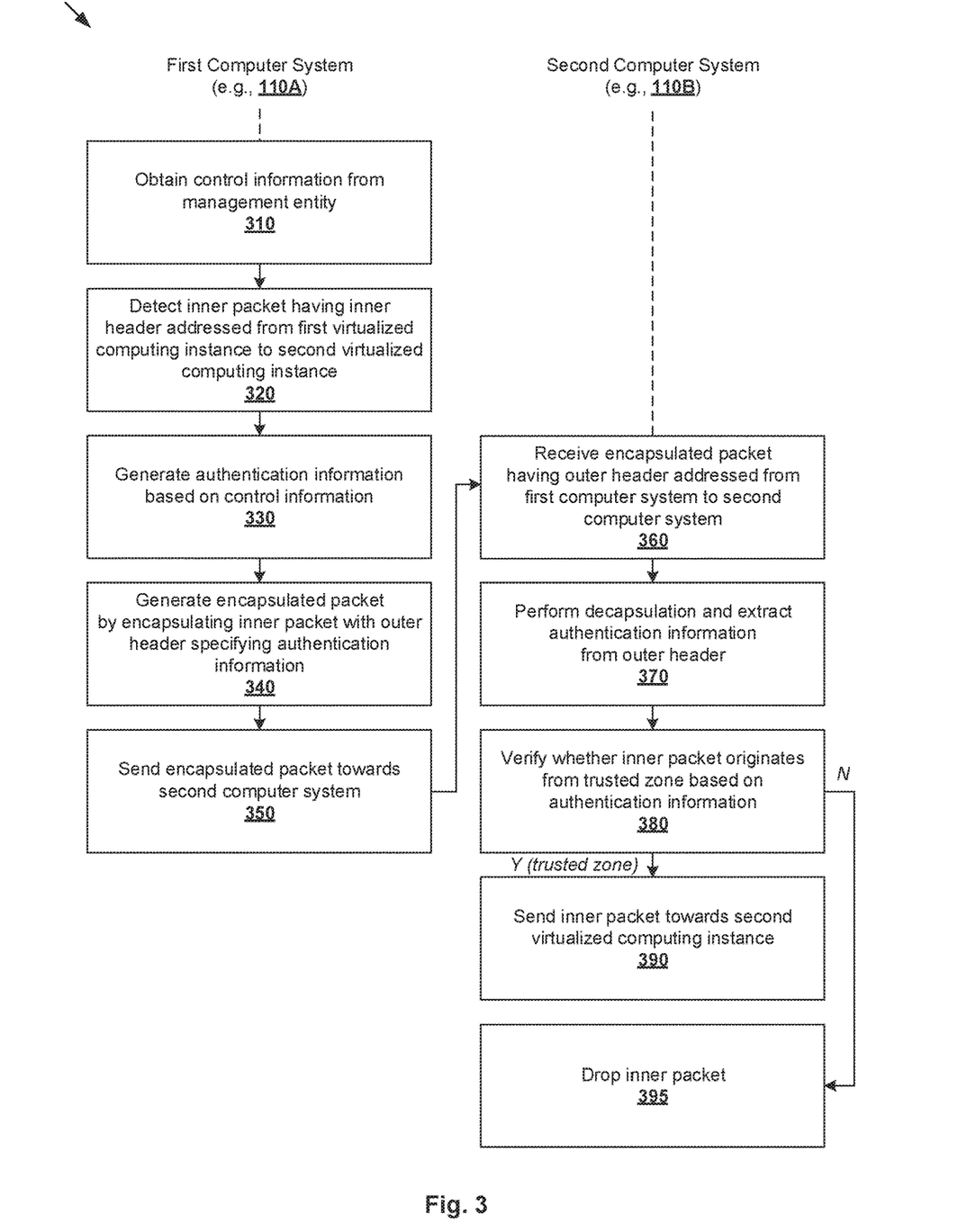
FIG. 3 is a flowchart of an example process for a first computer system to perform authentication for logical overlay network traffic in an SDN environment.

In more detail, FIG. 3 is a flowchart of example process 300 for a computer system to perform authentication for logical overlay network traffic. Example process 300 may include one or more operations, functions, or actions illustrated by one or more blocks, such as 310 to 395. The various blocks may be combined into fewer blocks, divided into additional blocks, and/or eliminated depending on the desired implementation. In practice, example process 300 may be implemented by any suitable "computer system," such as physical host 110A/110B/110C using hypervisor 114A/114B/114C and more particularly virtual switch 115A/115B/115C, etc.

At 310 in FIG. 3, hosts 110A-C may obtain control information (see 181-183 in FIG. 1) from SDN controller 160 for authentication of logical overlay network traffic. Here, the term "obtain" may refer generally to a computer system receiving or retrieving the control information (directly or indirectly) from the management entity, or a datastore accessible by the entity. For example in FIG. 1, SDN controller 160 may generate and send first control information 181 to host-A 110A, second control information 182 to host-B 110B and third control information 183 to host-C 110C.

At 320 in FIG. 3, host-A 110A may detect an (egress) inner packet (see 191 in FIG. 1 and FIG. 2) having an inner header that is addressed from source=VM1 131 supported by host-A 110A to destination=VM3 133 supported by host-B 110B. At 330, host-A 110A may generate authentication information associated with inner packet 190 based on control information 181 from SDN controller 160. The authentication information may indicate that inner packet 191 originates from a trusted zone, which should be contrasted against a non-trusted zone in which a malicious process may be operating.

As will be discussed further using FIG. 4, the authentication information may be generated at block 320 according to any suitable approach, such as an algorithm based on message authentication code (MAC), etc. In this case, control information 181/182/183 in FIG. 1 may include authentication key information ("AUTH_KEY") in the form of a shared secret key generated by SDN controller 160. One example MAC-based algorithm is hash-based message authentication code (HMAC), which is also known as keyed-hash message authentication code, etc.

At 340 and 350 in FIG. 3, source host-A 110A may generate and send an encapsulated packet (see 192 in FIG. 1) towards destination host-B 110B. Encapsulated packet 192 may be generated by encapsulating inner packet 191 with an outer header that specifies the authentication information and is addressed from host-A 110A to host-B 110B. By generating authentication information to indicate that inner packet 191 originates from the trusted zone, encapsulated packet 192 may be sent to cause host-B 110B to forward inner packet 191/193 to destination VM3 133.

As will be discussed using FIGS. 4-5, encapsulated packet may be generated according to a tunneling protocol (e.g., GENEVE) associated with a logical overlay tunnel connecting first VTEP-A 119A supported by host-A 110A and second VTEP-B 119B supported by host-B 110B. The outer header (e.g., GENEVE header) may be addressed from host-A 110A to host-B 110B, particularly from source VTEP-A 119A (e.g., source IP=IP-A) to VTEP-B 119B (e.g., destination IP=IP-B). As discussed above, first VTEP-A 119A may be an open interface that is accessible by a source (e.g., malicious process) from a non-trusted zone. The authentication information may be included in an option field in the outer header (e.g., GENEVE option field).

At the destination, blocks 360-395 in FIG. 3 may be performed by host-B 110B to process logical overlay network traffic from host-A 110A. At 360, 370 and 380, in response to receiving (ingress) encapsulated packet 192, host-B 110B may perform decapsulation and extract the authentication information from the outer header ("O1") to verify whether inner packet 191/193 originates from a trusted zone. If trusted (see 390), inner packet 191/193 is forwarded towards destination VM3 133, but dropped otherwise (see 395). Examples of the present disclosure may be implemented by any suitable computer systems, such as hosts 110A-C deployed in SDN environment 100 in FIG. 1, computer systems in a cross-cloud deployment (see FIG. 6), bare metal servers, etc.

Control Information

Figure 4:
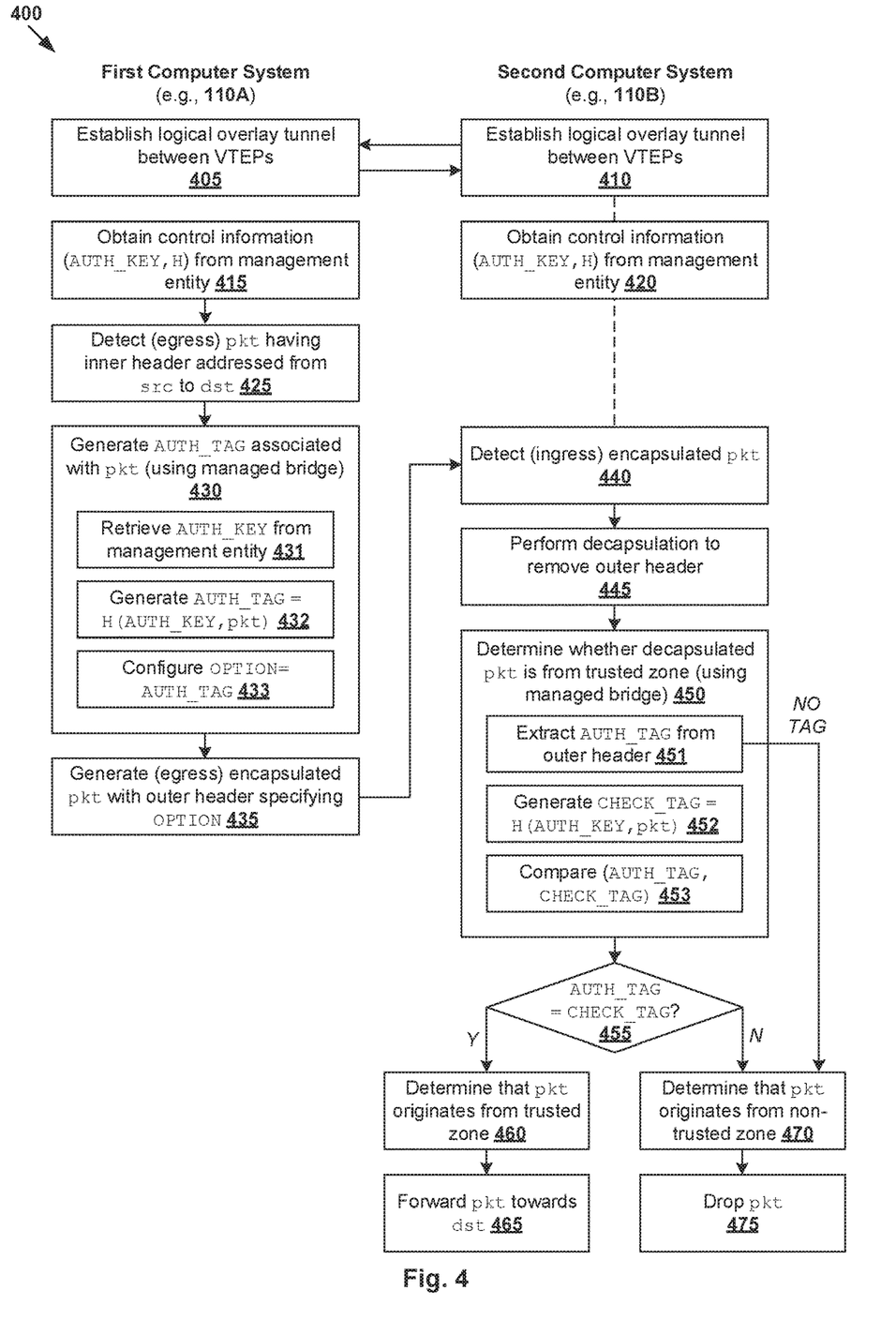
FIG. 4 is a flowchart of an example detailed process for computer systems to perform authentication for logical overlay network traffic in an SDN environment.

FIG. 4 is a flowchart of example detailed process 400 of authentication for logical overlay network traffic. Example process 400 may include one or more operations, functions, or actions illustrated at 405 to 475. The various operations, functions or actions may be combined into fewer blocks, divided into additional blocks, and/or eliminated depending on the desired implementation. The example in FIG. 4 will be explained using FIG. 5, which is a schematic diagram illustrating example authentication for logical overlay network traffic 500 in SDN environment 100 in FIG. 1.

At 405-410 in FIG. 4, hosts 110A-C may communicate via tunnels established among VTEPs 119A-C (also shown in FIG. 1) to facilitate logical overlay network traffic forwarding. One example tunneling protocol shown in FIG. 5 is GENEVE, which is used to establish logical overlay tunnels that act as backplanes among virtual switches 115A-C supported by respective hypervisors 114A-C. For example, a first logical overlay tunnel may be established between VTEP-A 119A on host-A 110A and VTEP-B 119B on host-B 110B to facilitate communication between VM1 131 and VM3 133. A second tunnel may be established between VTEP-A 119A and VTEP-C 119C on host-C 110C to facilitate communication between VM2 132 and VM6 136. The tunnels may be established over physical network 104 using any suitable transport protocol, such as UDP, etc.

At 415-420 in FIG. 4, hosts 110A-C may obtain control information 181-183 from SDN controller 160. Control information 181-183 may specify authentication key information (labelled "AUTH_KEY") and an algorithm for generating authentication information based on the authentication key information. Using HMAC for example, the authentication information may be generated as a function of (i) an inner packet (e.g., inner header and/or payload information) and (ii) authentication key information (e.g., shared secret key) that is known to both source and destination hosts. In practice, SDN controller 160 may refresh the authentication key information periodically to mitigate any security risk relating to the potential weakness of the algorithm and authentication key information.

Figure 5:
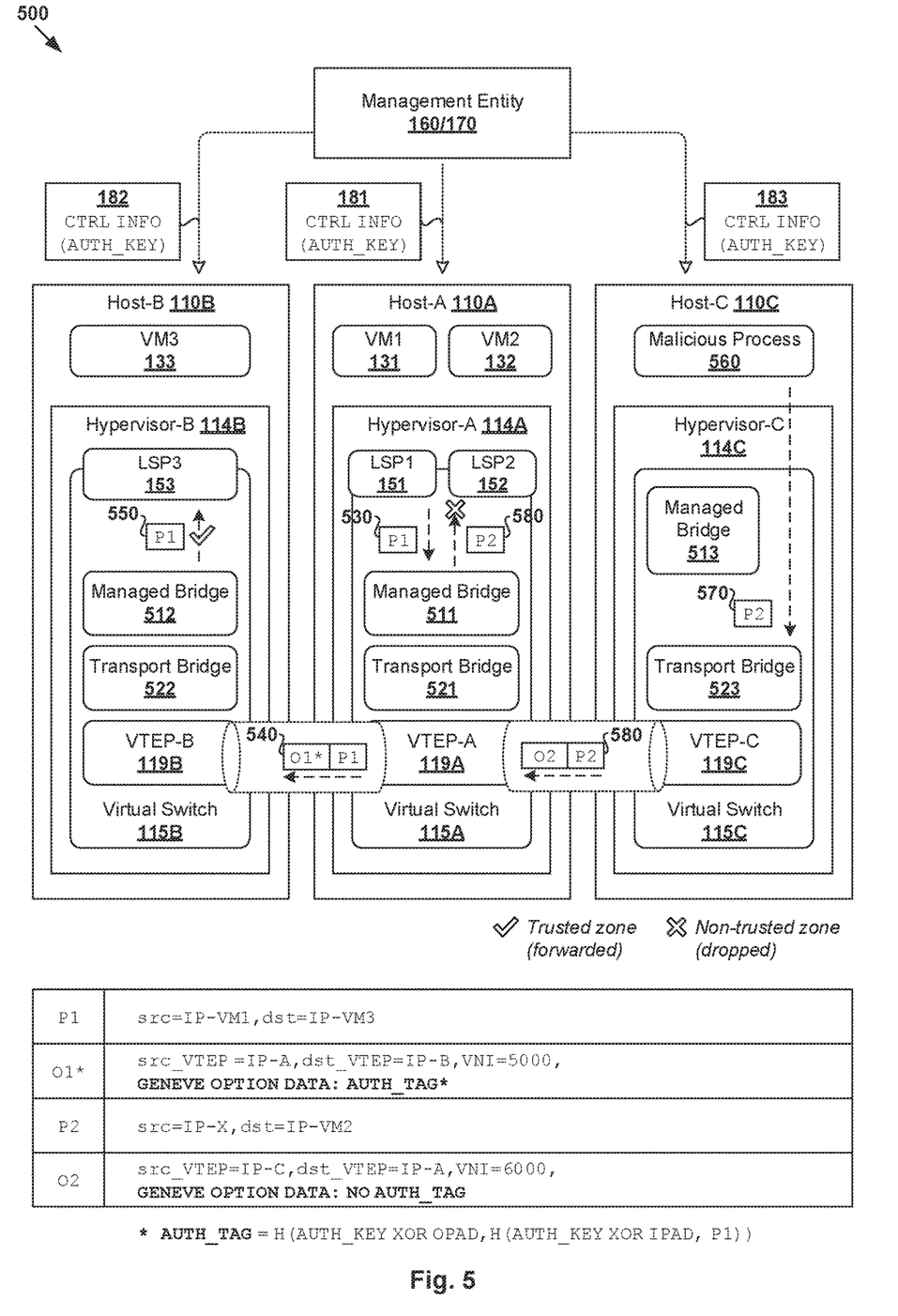
FIG. 5 is a schematic diagram illustrating an example authentication for logical overlay network traffic in the SDN environment in FIG. 1.

In the example in FIG. 5, host 110A/110B/110C supports managed bridge 511/512/513 ("first bridge") that is managed by and therefore under the control of SDN controller 160. Transport bridge 521/522/523 ("second bridge") is also supported by host 110A/110B/110C, but not managed by SDN controller 160. In this case, managed bridge 511/512/513 may be configured to be a trusted entity that communicates with SDN controller 160 via a secure channel (e.g., SSL channel). Logical overlay traffic handled by managed bridge 511/512/513 may be considered to have originated from a trusted zone. SDN controller 160 may push control information 181/182/183 to managed bridge 511/512/513 using any suitable protocol, such as OpenFlow™ from the Open Networking Foundation (ONF), etc.

In practice, VTEP 119A/119B/119C on transport bridge 521/522/523 may be configured to be an open interface that is not managed by SDN controller 160 and exposed to other processes running on host 110A/110B/110C. Also, the IP address of VTEP 119A/119B/119C is public and exposed to physical network 104 (i.e., underlay network) to facilitate communication with other VTEP(s). As such, VTEP 119A/119B/119C may be considered to be an "untrusted interface." As discussed above, this means that various processes (i.e., not limited to processes connected to managed bridge 511/512/513) may use VTEP 119A/119B/119C to send encapsulated packets over a logical overlay network tunnel established at blocks 405-410. A malicious process may take advantage of the open, untrusted interface to send encapsulated packets that are capable of evaluating distributed firewall rules on the recipient's fabric node. This may lead to the malicious process bypassing the distributed firewall rules, thereby exposing hosts 110A-C to security attacks.

Authentication Information

Using examples of the present disclosure, authentication may be performed to mitigate security risks relating to logical overlay network traffic handling. In particular, encapsulated packets transmitted via VTEP 119A/119B/119C may include authentication information to verify whether they originate from a trusted zone. In the following, consider an example involving source VM1 131 associated with source IP address=IP-VM1 and destination VM3 133 with destination IP address=IP-VM3.

(a) Source Processing

At 425-430 in FIG. 4, in response to detecting an egress inner packet (see "P1" 530) with an inner header that is addressed from VM1 131 to VM3 133, host-A 110A may generate authentication information associated with egress packet 530. For example, at 431, in response to detecting egress packet 530 via LSP1 151, managed bridge 511 may identify authentication key information (denoted as AUTH_KEY) in control information 181 from SDN controller 160. Further, at 432, managed bridge 511 may generate authentication information in the form of an authentication tag (denoted as AUTH_TAG) based on the authentication key information. At 433, managed bridge 511 may configure an option field specifying the authentication information.

For example, consider a case where H( )=HMAC algorithm, AUTH_KEY=authentication key from SDN controller 160, OPAD=byte 0x5c repeated hash block length, IPAD=byte 0x36 repeated hash block length, XOR=exclusive OR operation and P1=field(s) of inner packet "P1" 530. Applying the HMAC algorithm, AUTH_TAG may be generated as follows.

$$\text{AUTH\_TAG} = H(\text{AUTH\_KEY XOR OPAD}, H(\text{AUTH\_KEY XOR IPAD}, P1)).$$

At 435 in FIG. 4, host-A 110A may generate an encapsulated packet (see 540 in FIG. 5) by encapsulating "P1" 530 with an outer header (see "O1") specifying AUTH_TAG (see asterisk (*) in FIG. 5). Managed bridge 511 may insert AUTH_TAG into the outer header, such as a GENEVE option data field in a GENEVE header. The outer header is addressed from host-A 110A to host-B 110B, particularly from source VTEP IP address=IP-A associated with VTEP-A 119A to destination VTEP IP address=IP-B associated with VTEP-B 119B. At 440, host-A 110A may send encapsulated packet 540 towards host-B 110B via source VTEP-A 119A on transport bridge 521.

(b) Destination Processing

At 440 and 445 in FIG. 4, in response to receiving an ingress encapsulated packet (see 540 in FIG. 5), host-B 110B may perform decapsulation to remove the outer header from encapsulated packet 540. In practice, block 440 may involve transport bridge 522 receiving ingress encapsulated packet 540 and forwarding it to VTEP-B 119B for decapsulation.

At 450 in FIG. 4, host-B 110B may verify whether decapsulated (inner) packet 550 originates from a trusted zone based on the authentication information (AUTH_TAG). For example, block 450 may involve managed bridge 512 extracting ingress authentication information (AUTH_TAG) from the GENEVE option field in the outer header (see 451) and generating new authentication information (CHECK_TAG) for comparison purposes (see 452). Using the same HMAC algorithm and same authentication key information as host-A 110A, managed bridge 512 may generate CHECK_TAG based on inner packet "P1" 550.

At 455 (yes), 460 and 465 in FIG. 4, in response to determination that authentication information (AUTH_TAG) matches with the locally generally authentication information (CHECK_TAG), managed bridge 521 may determine that inner packet "P1" 550 originates from a trusted zone and forward it towards destination VM3 133 accordingly.

Otherwise, at 455 (*no*) and 470, managed bridge 521 may determine that inner packet "P1" 550 does not originate from a trusted source because there is no match between AUTH_TAG and CHECK_TAG. In this case, at 475, managed bridge 521 may drop inner packet "P1" 550 without forwarding it to VM3 133. Block 470 is also performed in response to determination that encapsulated packet 540 does not include any authentication information (see arrow from 451 to 470).

(c) Malicious Traffic

The above examples are also applicable to the communication between host-C 110C and host-A 110A. In this case, host-C 110C may act as a "first computer system," and host-A 110A as a "second computer system." Here, consider that a malicious process (see 560) on host-B 110B attempts to generate and send an egress inner packet (see "P2" 570) via VTEP-C 119C. VTEP-C 119C may perform encapsulation and send an egress encapsulated packet (see 580) with an outer header (labelled "O2") that is addressed from source VTEP IP-C to destination VTEP IP-A. Since inner packet "P2" 570 is not handled by managed bridge 513, the outer header does not include any authentication information.

At host-A 110A, authentication according to blocks 440-455 and 470-475 may be performed. In response to receiving (ingress) encapsulated packet 580, VTEP-A 119A may perform decapsulation to remove the outer header. Managed bridge 511 may then verify whether decapsulated packet "P2" 570/590 originates from a trusted zone. Since encapsulated packet 580 does not include any authentication information, managed bridge 511 may drop decapsulated packet "P2" 570/590 because it is not from a trusted zone. Alternatively (not shown in FIG. 5), malicious process 560 may attempt to generate encapsulated packet 580 with authentication information, which should be incorrect due to incorrect authentication key information. As such, any packets that do not originate from a trusted zone will be rejected, thereby protecting VMs 131-136 against malicious logical overlay network traffic.

Cross-Cloud Logical Overlay Network Traffic

Figure 6:
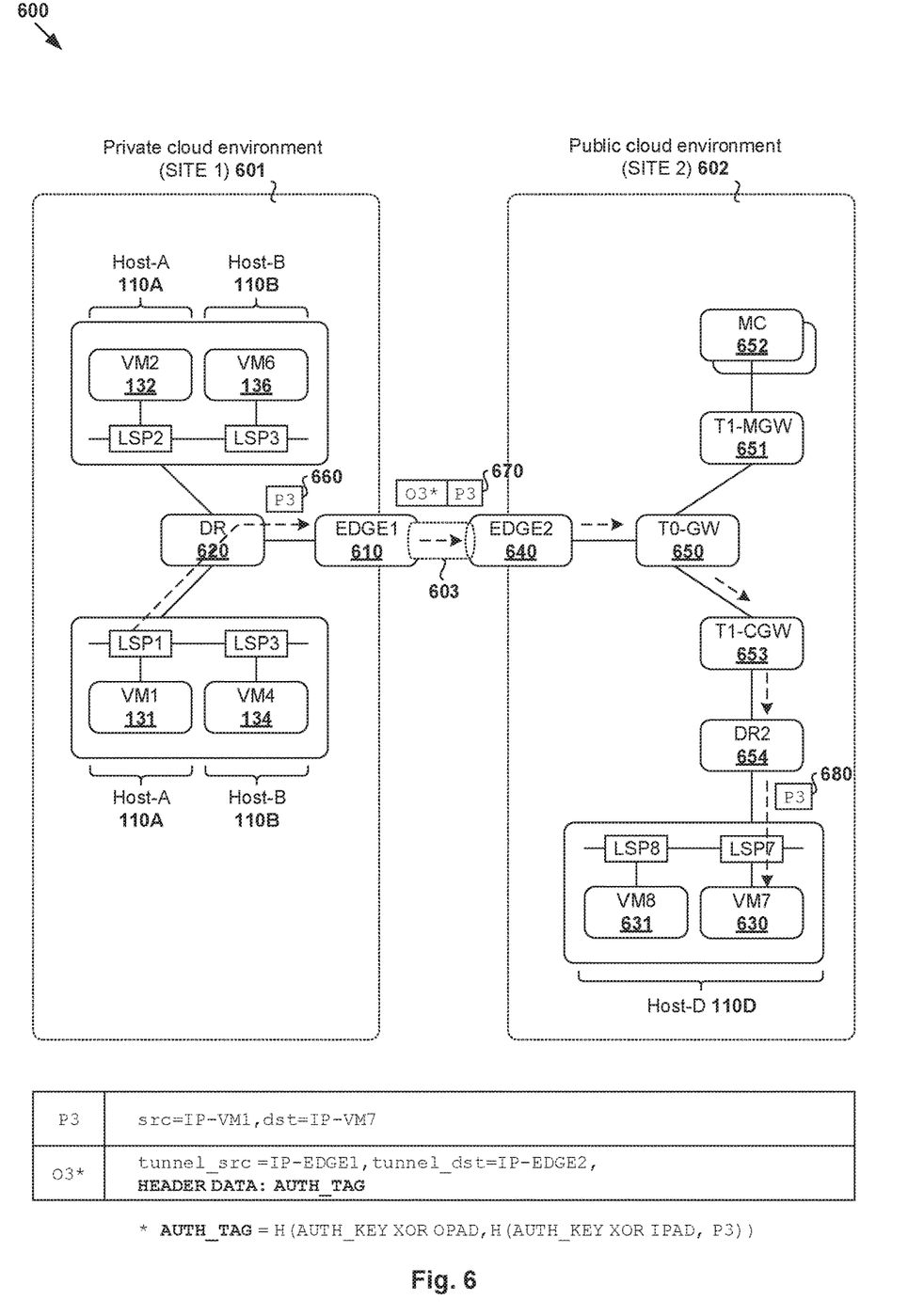
FIG. 6 is a schematic diagram illustrating an example authentication for logical overlay network traffic in a cross-cloud SDN environment.

Examples of the present disclosure may be implemented for SDN environments with cross-cloud connectivity. FIG. 6 is a schematic diagram illustrating example authentication for cross-cloud logical overlay network traffic 600. In this example, an SDN environment spans across multiple geographical sites, such as a first geographical site where private cloud environment 601 ("first cloud environment") is located, a second geographical site where public cloud environment 602 ("second cloud environment") is located, etc. In practice, the term "private cloud environment" may refer generally to an on-premise data center or cloud platform supported by infrastructure that is under an organization's private ownership and control. In contrast, the term "public cloud environment" may refer generally a cloud platform supported by infrastructure that is under the ownership and control of a public cloud provider.

In practice, a public cloud provider is generally an entity that offers a cloud-based platform to multiple users or tenants. This way, a user may take advantage of the scalability and flexibility provided by public cloud environment 602 for data center capacity extension, disaster recovery, etc. Depending on the desired implementation, public cloud environment 602 may be implemented using any suitable cloud technology, such as Amazon Web Services® (AWS) and Amazon Virtual Private Clouds (VPCs); VMware Cloud™ on AWS; Microsoft Azure®; Google Cloud Platform™, IBM Cloud™; a combination thereof, etc. Amazon VPC and Amazon AWS are registered trademarks of Amazon Technologies, Inc.

In the example in FIG. 6, public cloud environment 602 will be exemplified using VMware Cloud™ on AWS. It should be understood that any additional and/or additional cloud technology may be implemented. EDGE1 206/610 is deployed at the edge of private cloud environment 601 to handle traffic to and from public cloud environment 602. EDGE1 610 is connected with public cloud environment 602 via EDGE2 640 (e.g., virtual gateway) that is connected with tier-1 management gateway 651 (labelled "T1-MGW") and tier-1 compute gateway 653 (labelled "T1-CGW") via tier-0 gateway 650 (labelled "T0-GW"). In practice, T0-GW 650, MGW 651 and CGW 653 may be logical constructs that are implemented by an edge appliance in public cloud environment 602.

T1-MGW 651 may be deployed to handle management-related traffic to and/or from management component(s) 652 (labelled "MC") for managing various entities within public cloud environment 602. T1-CGW 653 may be deployed to handle workload-related traffic to and/or from VMs, such as VM7 630 and VM8 631. EDGE1 610 in private cloud environment 601 may communicate with EDGE2 640 in public cloud environment 602 using any suitable tunnel(s) 603, such as GRE, Internet Protocol Security (IPSec), layer-2 virtual private network (L2VPN), direct connection, etc. This way, VM1 131 in private cloud environment 601 may send packets to VM7 630 in public cloud environment 602 via tunnel 603.

According to examples of the present disclosure, authentication may be performed using host-A 110A acting as a "first computer system" in private cloud environment 601 and host-D 110D as a "second computer system" in public cloud environment 602. In this case, encapsulated packet 670 between host-A 110A and host-D 110D may include an outer header (labelled "O3") specifying authentication information to indicate that inner packet "P3" 660 originates from a trusted zone. In the example in FIG. 6, outer header "O3" may include a GENEVE outer header for transmission from one host to another, and a GRE header for transmission from EGDE1 610 to EDGE2 620. Examples of the present disclosure may be implemented to include authentication information in the outer header, such as the GENEVE outer header.

Similar to the example in FIG. 5, managed bridge 511 on host-A 110A may generate the authentication information (AUTH_TAG) based on control information 181 (AUTH_KEY) from SDN controller 160 and an HMAC-based algorithm. Encapsulated packet 670 is then forwarded from VTEP-A 119A on host-A 110A to another VTEP (not shown) on host-D 110D. At host-D 110D, decapsulated packet "P3" 680 may be forwarded towards VM7 630 in response to a successful authentication process (i.e., originates from trusted zone), but dropped otherwise (i.e., originates from non-trusted zone). The examples discussed using FIGS. 3-5 are also applicable and will not be repeated here for brevity.

Container Implementation

Although explained using VMs, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 6, container technologies may be used to run various containers inside respective VMs. Containers are "OS-less", meaning that they do not include any OS that could weigh 10 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

For the container case, privileged containers may experience the security risks discussed using FIG. 1. For example, user identifier (UID) 0 in a container may behave the same in that container as it does on a computer system supporting the container. In practice, privileged containers are generally difficult to secure. Using examples of the present disclosure, authentication information may be generated and included in encapsulated packets having respective inner packets from a container associated with a trusted zone. Various examples discussed using FIG. 1 to FIG. 6 are also applicable here and will not be repeated for brevity.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 6. For example, the instructions or program code, when executed by the processor of the computer system, may cause the processor to perform network troubleshooting according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first computer system to perform authentication for logical overlay network traffic, the method comprising:
    detecting an inner packet having an inner header that is addressed from a first virtualized computing instance to a second virtualized computing instance;
    based on control information from a manager, generating authentication information associated with the inner packet, wherein the authentication information indicates that the inner packet originates from a trusted zone;
    generating an encapsulated packet by encapsulating the inner packet with an outer header specifying the authentication information, wherein the outer header is addressed from the first computer system to a second computer system; and
    sending the encapsulated packet towards the second virtualized computing instance to cause the second computer system to verify that the inner packet originates from the trusted zone based on the authentication information and to forward the inner packet towards the second virtualized computing instance.

2. The method of claim 1, wherein sending the encapsulated packet comprises:
    sending the encapsulated packet via a first virtual tunnel endpoint (VTEP) supported by the first computer system to a second VTEP supported by the second computer system, wherein the first VTEP is an open interface that is accessible by a source from a non-trusted zone.

3. The method of claim 2, wherein generating the authentication information comprises:
identifying, by a managed bridge supported by the first computer system, authentication key information from the control information; and
generating, by the managed bridge, the authentication information based on the authentication key information and the inner packet, wherein the second computer system is configured to verify the authentication information based on the same authentication key.

4. The method of claim 2, wherein generating the encapsulated packet comprises:
generating the encapsulated packet using a transport bridge that is supported by the first computer system but not managed by the manager.

5. The method of claim 1, wherein generating the encapsulated packet comprises:
configuring an option field in the outer header of the encapsulated packet to include the authentication information.

6. The method of claim 1, further comprising:
receiving, from the second computer system or a third computer system, an ingress encapsulated packet that includes an ingress inner packet and an ingress outer header;
extracting ingress authentication information from the ingress outer header; and
based on the ingress authentication information and the control information from the manager, determining whether the ingress inner packet originates from the trusted zone.

7. The method of claim 6, further comprising:
in response to determination that the ingress inner packet does not originate from the trusted zone, dropping the ingress inner packet.

8. A non-transitory computer-readable storage medium that includes a set of instructions which, in response to execution by a processor of a first computer system, cause the processor to perform authentication for logical overlay network traffic, wherein the method comprises:
detecting an inner packet having an inner header that is addressed from a first virtualized computing instance to a second virtualized computing instance;
based on control information from a manager, generating authentication information associated with the inner packet, wherein the authentication information indicates that the inner packet originates from a trusted zone;
generating an encapsulated packet by encapsulating the inner packet with an outer header specifying the authentication information, wherein the outer header is addressed from the first computer system to a second computer system; and
sending the encapsulated packet towards the second virtualized computing instance to cause the second computer system to verify that the inner packet originates from the trusted zone based on the authentication information and to forward the inner packet towards the second virtualized computing instance.

9. The non-transitory computer-readable storage medium of claim 8, wherein sending the encapsulated packet comprises:
sending the encapsulated packet via a first virtual tunnel endpoint (VTEP) supported by the first computer system to a second VTEP supported by the second computer system, wherein the first VTEP is an open interface that is accessible by a source from a non-trusted zone.

10. The non-transitory computer-readable storage medium of claim 9, wherein generating the authentication information comprises:
identifying, by a managed bridge supported by the first computer system, authentication key information from the control information; and
generating, by the managed bridge, the authentication information based on the authentication key information and the inner packet, wherein the second computer system is configured to verify the authentication information based on the same authentication key.

11. The non-transitory computer-readable storage medium of claim 9, wherein generating the encapsulated packet comprises:
generating the encapsulated packet using a transport bridge that is supported by the first computer system but not managed by the manager.

12. The non-transitory computer-readable storage medium of claim 8, wherein generating the encapsulated packet comprises:
configuring an option field in the outer header of the encapsulated packet to include the authentication information.

13. The non-transitory computer-readable storage medium of claim 8, wherein the method further comprises:
receiving, from the second computer system or a third computer system, an ingress encapsulated packet that includes an ingress inner packet and an ingress outer header;
extracting ingress authentication information from the ingress outer header; and
based on the ingress authentication information and the control information from the manager, determining whether the ingress inner packet originates from the trusted zone.

14. The non-transitory computer-readable storage medium of claim 13, wherein the method further comprises:
in response to determination that the ingress inner packet does not originate from the trusted zone, dropping the ingress inner packet.

15. A computer system, being a first computer system, comprising:
a processor; and
a non-transitory computer-readable medium having stored thereon instructions that, in response to execution by the processor, cause the processor to:
detect an inner packet having an inner header that is addressed from a first virtualized computing instance to a second virtualized computing instance;
based on control information from a manager, generate authentication information associated with the inner packet, wherein the authentication information indicates that the inner packet originates from a trusted zone;
generate an encapsulated packet by encapsulating the inner packet with an outer header specifying the authentication information, wherein the outer header is addressed from the first computer system to a second computer system; and
send the encapsulated packet towards the second virtualized computing instance to cause the second computer system to verify that the inner packet originates from the trusted zone based on the authentication information and to forward the inner packet towards the second virtualized computing instance.

16. The computer system of claim 15, wherein the instructions that cause the processor to send the encapsulated packet cause the processor to:
send the encapsulated packet via a first virtual tunnel endpoint (VTEP) supported by the first computer system to a second VTEP supported by the second computer system, wherein the first VTEP is an open interface that is accessible by a source from a non-trusted zone.

17. The computer system of claim 16, wherein the instructions that cause the processor to generate the authentication information cause the processor to:
identify, by a managed bridge supported by the first computer system, authentication key information from the control information; and
generate, by the managed bridge, the authentication information based on the authentication key information and the inner packet, wherein the second computer system is configured to verify the authentication information based on the same authentication key.

18. The computer system of claim 16, wherein the instructions that cause the processor to generate the encapsulated packet cause the processor to:
generate the encapsulated packet using a transport bridge that is supported by the first computer system but not managed by the manager.

19. The computer system of claim 15, wherein the instructions that cause the processor to generate the encapsulated packet cause the processor to:
configure an option field in the outer header of the encapsulated packet to include the authentication information.

20. The computer system of claim 15, wherein the instructions further cause the processor to:
receive, from the second computer system or a third computer system, an ingress encapsulated packet that includes an ingress inner packet and an ingress outer header;
extract ingress authentication information from the ingress outer header; and
based on the ingress authentication information and the control information from the manager, determine whether the ingress inner packet originates from the trusted zone.

21. The computer system of claim 20, wherein the instructions further cause the processor to:
in response to determination that the ingress inner packet does not originate from the trusted zone, drop the ingress inner packet.

* * * * *